United States Patent
Opsitch

(10) Patent No.: US 9,482,364 B2
(45) Date of Patent: Nov. 1, 2016

(54) BUTTERFLY VALVE ARRANGEMENT

(71) Applicant: ALSTOM Technology Ltd, Baden (CH)

(72) Inventor: Antonin Opsitch, Baden (CH)

(73) Assignee: General Electric Technology GmbH, Baden (CH)

( * ) Notice: Subject to any disclaimer, the term of this patent is extended or adjusted under 35 U.S.C. 154(b) by 167 days.

(21) Appl. No.: 14/468,940

(22) Filed: Aug. 26, 2014

(65) Prior Publication Data

US 2015/0076382 A1    Mar. 19, 2015

(30) Foreign Application Priority Data

Sep. 17, 2013    (EP) .................................... 13184759

(51) Int. Cl.
  *F16K 39/02*    (2006.01)
  *F16K 1/22*    (2006.01)
  *F16K 1/24*    (2006.01)

(52) U.S. Cl.
  CPC ............. *F16K 39/026* (2013.01); *F16K 1/221* (2013.01); *F16K 1/24* (2013.01); *F16K 39/024* (2013.01); *F16K 39/028* (2013.01); *Y10T 137/86936* (2015.04); *Y10T 137/86984* (2015.04)

(58) Field of Classification Search
  CPC .......... F16K 1/221; F16K 1/223; F16K 1/24; F16K 39/024; F16K 39/026; F16K 39/028; Y10T 137/86734; Y10T 137/86759; Y10T 137/86928; Y10T 137/86936; Y10T 137/86976; Y10T 137/86984
  USPC ........... 137/625.3, 625.33, 628, 629, 630.14, 137/630.15; 251/215, 229, 305
  See application file for complete search history.

(56) References Cited

U.S. PATENT DOCUMENTS

| | | | | |
|---|---|---|---|---|
| 2,619,110 A | * | 11/1952 | Griswold | .............. F16K 31/124 |
| | | | | 137/488 |
| 3,697,042 A | | 10/1972 | Killian | |
| 3,854,696 A | | 12/1974 | Keyes et al. | |
| 5,005,805 A | * | 4/1991 | Morris | .................. F16K 5/0242 |
| | | | | 251/163 |
| 5,108,073 A | * | 4/1992 | Adachi | ............... F16K 31/5282 |
| | | | | 251/163 |
| 2012/0256112 A1 | | 10/2012 | Baumann | |

FOREIGN PATENT DOCUMENTS

| | | |
|---|---|---|
| CA | 2058427 C | 1/1991 |
| FR | 1 354 188 A | 3/1964 |

(Continued)

OTHER PUBLICATIONS

Extended European Search Report dated Feb. 27, 2014, issued by the European Patent Office in the corresponding European Application No. 13184759.2. (6 pages).

*Primary Examiner* — Mary McManmon
*Assistant Examiner* — Richard K Durden
(74) *Attorney, Agent, or Firm* — GE Global Patent Operation

(57) ABSTRACT

A butterfly valve with a housing having a bypass passage located within the housing of the valve. The passage extends from the normal flow path through the valve, either side of the butterfly valve plate so as to provide an alternative flow path. A cavity is located between distal ends of the passage. A valve head, located in the cavity is configured and arranged to be movable within the cavity between a closed position in which, the distal ends of the passage are fluidly disconnected through the passage and an open position in which the distal ends of the passage are fluidly connected through the passage.

10 Claims, 1 Drawing Sheet

(56) References Cited

FOREIGN PATENT DOCUMENTS

| GB | 2 084 296 A | 4/1982 |
| WO | 2012-097539 A1 | 7/2012 |
| WO | WO 2012/166413 A1 | 12/2012 |

* cited by examiner

BUTTERFLY VALVE ARRANGEMENT

TECHNICAL FIELD

The present disclosure relates generally to butterfly valve configurations and specifically to arrangements that address the problem of high opening and closing torque requirements of such valves.

BACKGROUND INFORMATION

As described by WO 2012/166413, a butterfly valve typically comprises a housing that has an inlet, an outlet and a flow path extending there through. A valve plate, located in the flow path, is typically configured to selectively allow and prevent fluid flow through the flow path. This is achieved by a shaft member being rotationally connected to the valve plate so as to enable the rotation of the valve plate perpendicular to the extension of the flow path.

Such butterfly valves are commonly used because they have the advantage of low cost, simple design, high stability and high efficiency. However, one problem faced by butterfly valves is that they require high opening and closing torques when the pressure drop across the valve is high. This typically limits the use of butterfly valves to services with a maximum pressure difference in the region of 30 bar.

To overcome this problem, various solutions have been developed including providing the valve with actuated opening plates. An example is provided in Canadian patent No. CA 2 058 427 C in which an actuated pivotal plate-like valve plate incorporated in the valve plate is discussed. WO 2012/166413 provides another such valve plate solution.

Each of these solutions adds significant complexity and therefore cost to the valve and therefore potentially lessens some of the potential advantages of a butterfly valve.

Another solution discussed in US patent application no. 2012/0256112 A1 involves providing a disk with a tilted disk that has a Z shaped disk vertical profile. In the open position such a valve has an increased profile that provides an increased resistance to flow.

None of these solutions provide complete solutions and so therefore there is a continued need to find alternatives that overcome the problem of high opening and closing torque requirements of a butterfly valve.

SUMMARY

A butterfly valve is disclosed that is intended to provide at least a partial solution to the problem of high opening and closing torque.

It attempts to addresses this problem by means of the subject matter of the independent claim. Advantageous embodiments are given in the dependent claims.

The disclosure is based on the general idea of providing a secondary flow passage through the valve that contains a valve head. By fully containing the passage within the valve, the unit is made compact, while the valve head brings controllability to the bypass flow. In this way, the pressure across the valve plate can be reduced thus reducing the opening and closing torque of the valve.

In an aspect a butterfly valve has a housing with a flow path therethrough, a valve plate located in the flow path, and a shaft connected to the valve plate. The shaft is configured and arranged to rotate so as to selectively allow and prevent fluid flow through the flow path. A passage, located within the housing, extends from and to the flow path on either side of the valve plate so as to provide an alternative flow path that bypasses the valve plate. Locating the passage wholly within the housing ensures that the size of the arrangement is minimised. Additionally, a cavity is located in the passage between distal ends of the passage. A valve head, located in the cavity, is configured and arranged to be movable within the cavity between a closed position, in which, in the passage, the distal ends of the passage are fluidly disconnected and an open position in which, in the passage, the distal ends of the passage are fluidly connected.

In a further aspect, the shaft and the valve head are configured and arranged such that the opening and closing of the passage by the valve head is realised by rotation of the shaft. This eliminates the need for additional actuation of the valve head, greatly simplifying the arrangement.

In a further aspect, the shaft at least partially extends through the cavity and the valve head is configured for movement limited to the direction of the rotational axis of the shaft, that is movement along the shaft.

In an aspect, the butterfly valve further comprises a lateral member on a shaft portion located within the cavity and an extended groove. The extended groove is located in the valve head and extends at an angle oblique to the rotational axis of the shaft. The lateral member is sized and shaped to movably fit within the groove while the oblique angle of the groove is such that rotation of the shaft portions results in the movement of the valve head along the rotational axis of the shaft between a passage open position and a passage closed position. In this way, the valve head may be operated by means of shaft rotation without the need for an additional or separate actuation means.

In a further aspect, the groove has the largest angle from the shaft direction at the valve plate closed position.

It is a further object of the invention to overcome or at least ameliorate the disadvantages and shortcomings of the prior art or provide a useful alternative.

Other aspects and advantages of the present disclosure will become apparent from the following description, taken in connection with the accompanying drawings which by way of example illustrate exemplary embodiments of the present invention.

BRIEF DESCRIPTION OF THE DRAWINGS

By way of example, an embodiment of the present disclosure is described more fully hereinafter with reference to the accompanying drawings, in which.

DETAILED DESCRIPTION

Figure 1:
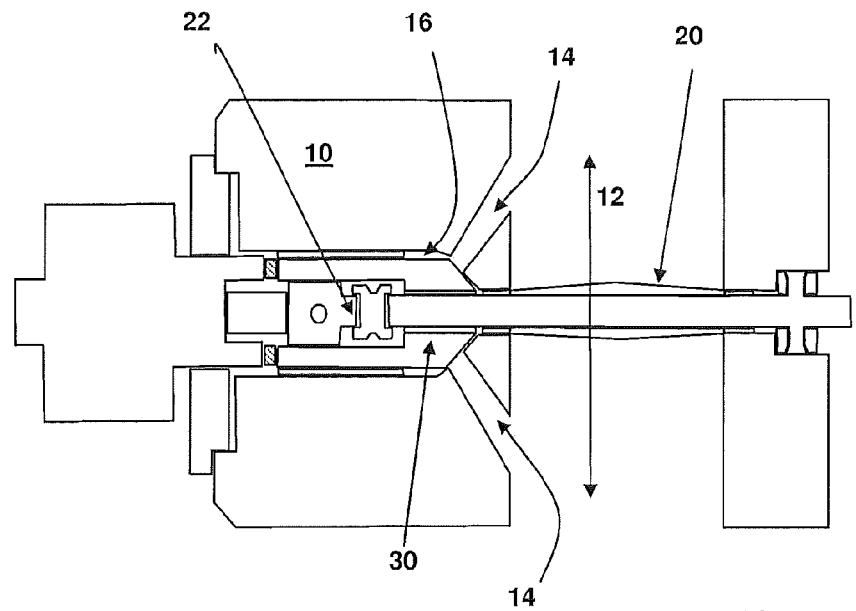
FIG. 1 is a sectional view of a butterfly valve with a bypass passage according to an preferred embodiment of the invention.

Exemplary embodiments of the present disclosure are now described with reference to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiment disclosed herein.

In an exemplary embodiment of a butterfly valve shown in FIG. 1, the valve has a housing 10 with a flow path 12 therethrough. A valve plate 20, which is located in the flow path 12, is further connected to a shaft 22. Rotation of the shaft 22, typically in an axis perpendicular to the axis of the flow path, results in the valve either allowing or preventing fluid flow through the flow path. The shaft 22 itself may comprise more than one part, for example, it may include an actuator portion that is connected to a manual or automated actuator via a coupling. The shaft 22 may further comprise a lower portion that forms part of, or is joined to, the valve plate 20.

The valve further includes a passage 14 through the housing 10 that extends from the flow path 12 on either side of the valve plate 20. As such, the passage 14 provides a bypass around the valve plate 20 so as to provide an alternative flow path that bypasses the valve plate 20. A section of the passage 14, between the two distal ends, includes a cavity 16. In the cavity 16 is a valve head 30 that is movable within the cavity 16 between a closed position in which, in the passage 14, the distal ends of the passage 14 are fluidly disconnected and an open position in which, in the passage 14, the distal ends of the passage 14 are fluidly connected. The positional movement of the valve head 30 to achieve the open and closed configuration includes known valve configurations, including rotational movement and movement along the rotational axis of the shaft.

Figure 2:
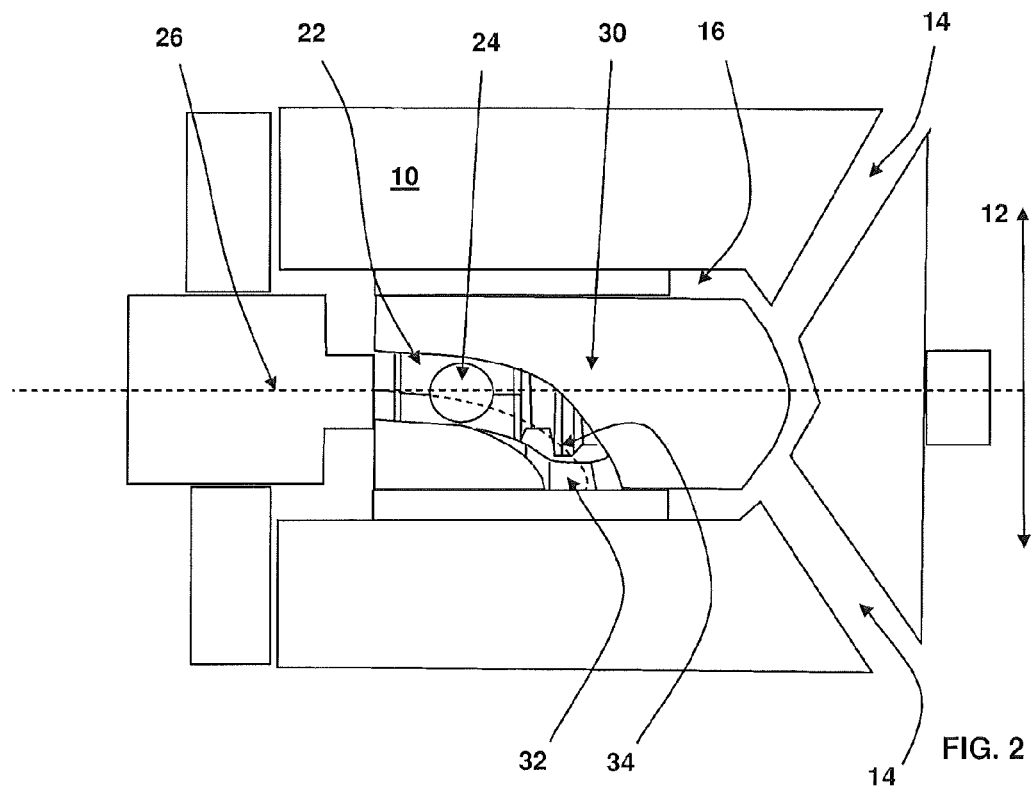
FIG. 2 is sectional view of a butterfly valve of a preferred embodiment showing the valve head groove and shaft lateral member.

FIG. 2 shows an exemplary embodiment where the valve head 30 is configured and arranged to move in the rotational axis 26 of the shaft 22 by means of rotation of the shaft 22. This is achieved by a cam arrangement in which the shaft 22 includes a lateral member 24 that fits within a groove 32 in the valve head 30. The groove 32 extends in an oblique angle to the direction of rotational axis 26 of the shaft, wherein the oblique angle is defined by the angle between a tangent line to the groove centreline 34 at any given point along the groove as tangent line meets the rotational axis 26 of the shaft 22. Thus, when the shaft 22 is rotated, the valve head 30 is raised or lowered within the cavity 16. In this way, the passage 14 is opened and closed respectively. The oblique angle is preferably not constant across the length of the groove but instead varies so as to optimise the opening and closing torque of the passage 14. A preferred shape of the groove 32 is such that the force function of the valve opening is as linear as possible. This may be achieved by configuring the groove angle so that the shaft member applies maximum torque on the valve head 30 at the closed position of the valve head 30.

Although the disclosure has been herein shown and described in what is conceived to be the most practical exemplary embodiment, it will be appreciated that the present disclosure can be embodied in other specific forms. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

REFERENCE NUMBERS

10 Housing
12 Flow path
14 Passage
16 Cavity
20 Valve plate
22 Shaft
24 Lateral member
26 Rotational axis
30 Valve head
32 Groove
34 Centreline

What is claimed:

1. A butterfly valve comprising:
   a housing having a flow path therethrough;
   a valve plate located in the flow path; and
   a shaft connected to the valve plate,
   wherein the valve plate is configured and arranged to be rotated by the shaft so as to selectively allow and prevent fluid flow through the flow path;
      a passage, within the housing, with distal ends extending from the flow path on one side of the valve plate to the flow path on another side of the valve plate so as to provide an alternative flow path that bypasses the valve plate;
      a cavity between the distal ends of the passage; and
      a valve head, in the cavity, configured and arranged to be movable within the cavity between a closed position in which the distal ends of the passage are fluidly disconnected through the passage and an open position in which the distal ends of the passage are fluidly connected through the passage.

2. The butterfly valve of claim 1 wherein the shaft and the valve head are configured and arranged such that the opening and closing of the passage by the valve head will result from rotation of the shaft.

3. The butterfly valve of claim 1 wherein the shaft at least partially extends through the cavity and the valve head is configured for movement limited to a direction of a rotational axis of the shaft.

4. The butterfly valve of claim 1 further comprising:
   a lateral member on a shaft portion located within the cavity; and
   a groove, in the valve head, extending at an angle oblique to the rotational axis of the shaft,
   wherein the lateral member is sized and shaped to movably fit within the groove, and the oblique angle of the groove is such that rotation of the shaft will result in a movement of the valve head along the rotational axis of the shaft between a passage open position and a passage closed position.

5. The butterfly valve of claim 4 wherein the groove has a largest angle from the rotational axis of the shaft at a valve plate closed position.

6. The butterfly valve of claim 2 wherein the shaft at least partially extends through the cavity and the valve head is configured for movement limited to a direction of the rotational axis of the shaft.

7. The butterfly valve of claim 2 further comprising:
   a lateral member on a shaft portion located within the cavity; and
   a groove, in the valve head, extending at an angle oblique to the rotational axis of the shaft,
   wherein the lateral member is sized and shaped to movably fit within the groove, and the oblique angle of the groove is such that rotation of the shaft will result in a movement of the valve head along the rotational axis of the shaft between a passage open position and a passage closed position.

8. The butterfly valve of claim 6 further comprising:
   a lateral member on a shaft portion located within the cavity; and
   a groove, in the valve head, extending at an angle oblique to the rotational axis of the shaft,
   wherein the lateral member is sized and shaped to movably fit within the groove, and the oblique angle of the groove is such that rotation of the shaft will result in a movement of the valve head along the rotational axis of the shaft between a passage open position and a passage closed position.

9. The butterfly valve of claim 7 wherein the groove has a largest angle from the rotational axis of the shaft at a valve plate closed position.

10. The butterfly valve of claim 8 wherein the groove has a largest angle from the rotational axis of the shaft at a valve plate closed position.

* * * * *